(12) United States Patent
Sinha et al.

(10) Patent No.: US 9,277,403 B2
(45) Date of Patent: Mar. 1, 2016

(54) AUTHENTICATION METHOD AND DEVICE

(75) Inventors: Abhinav Sinha, Guragaon (IN);
Abhishek Sinha, Gurgaon (IN);
Anupam Varghese, New Delhi (IN);
Prasad Naldurg, Bangalore (IN);
Raghav Bhaskar, Bangalore (IN);
Saurabh Panjwani, Bangalore (IN)

(73) Assignee: Eko India Financial Services Pvt. Ltd. (IN)

( * ) Notice: Subject to any disclaimer, the term of this patent is extended or adjusted under 35 U.S.C. 154(b) by 0 days.

(21) Appl. No.: 13/582,419

(22) PCT Filed: Mar. 1, 2011

(86) PCT No.: PCT/IN2011/000128
§ 371 (c)(1),
(2), (4) Date: Nov. 12, 2012

(87) PCT Pub. No.: WO2011/108004
PCT Pub. Date: Sep. 9, 2011

(65) Prior Publication Data
US 2013/0061057 A1    Mar. 7, 2013

(30) Foreign Application Priority Data
Mar. 2, 2010  (IN) ............................... 451/DEL/2010

(51) Int. Cl.
*G06F 21/00*    (2013.01)
*H04W 12/06*    (2009.01)
*H04L 29/06*    (2006.01)

(52) U.S. Cl.
CPC ........... *H04W 12/06* (2013.01); *H04L 63/0428* (2013.01); *H04L 63/083* (2013.01)

(58) Field of Classification Search
CPC . H04L 63/0838; H04L 9/3228; H04L 9/0861; H04L 9/3234; H04L 63/0428; H04L 63/083; H04W 12/06
USPC .......................... 713/159, 184; 726/9; 380/44
See application file for complete search history.

(56) References Cited

U.S. PATENT DOCUMENTS

| | | | |
|---|---|---|---|
| 5,177,789 A * | 1/1993 | Covert | 713/184 |
| 6,166,733 A * | 12/2000 | Yamada | 715/776 |
| 6,696,919 B1 * | 2/2004 | Leickel et al. | 340/5.74 |
| 8,769,784 B2 * | 7/2014 | Ganesan et al. | 26/4 |
| 2004/0003287 A1 * | 1/2004 | Zissimopoulos et al. | 713/201 |

(Continued)

OTHER PUBLICATIONS

Som et al, Session Key Based Manipulated Iteration Encryption Technique, IEEE, 2008, pp. 694-698.*

(Continued)

*Primary Examiner* — Luu Pham
*Assistant Examiner* — Jenise Jackson
(74) *Attorney, Agent, or Firm* — Kendal M. Sheets

(57) ABSTRACT

The present invention describes a method for authenticating a user of a mobile device by a verification authority, by making use of at least a personal identification number (PIN) and at least one cryptographic key, such that the PIN and the cryptographic key is known only to the user and the verification authority. The cryptographic key has at least one session key. Firstly, the user encodes the PIN by using at least one session key and then transfers the encoded PIN to a predefined address of the verification authority via the mobile device. Next, the verification authority decodes the PIN by using the cryptographic key authenticates the user if the decoded PIN matches a PIN stored corresponding to the user.

17 Claims, 6 Drawing Sheets

(56) References Cited

U.S. PATENT DOCUMENTS

| | | | |
|---|---|---|---|
| 2004/0187018 A1* | 9/2004 | Owen et al. | 713/200 |
| 2005/0150945 A1* | 7/2005 | Choi | 235/379 |
| 2005/0250538 A1* | 11/2005 | Narasimhan et al. | 455/558 |
| 2006/0136334 A1* | 6/2006 | Atkinson et al. | 705/40 |
| 2006/0212706 A1* | 9/2006 | Jiang et al. | 713/176 |
| 2007/0067833 A1* | 3/2007 | Colnot | 726/9 |
| 2008/0103984 A1* | 5/2008 | Choe et al. | 705/76 |
| 2008/0172730 A1* | 7/2008 | Sandhu et al. | 726/9 |
| 2008/0228653 A1* | 9/2008 | Holdsworth | 705/67 |
| 2008/0276098 A1* | 11/2008 | Florencio et al. | 713/183 |
| 2009/0235339 A1* | 9/2009 | Mennes et al. | 726/5 |
| 2009/0323972 A1* | 12/2009 | Kohno et al. | 380/284 |
| 2010/0088754 A1* | 4/2010 | Ghislanzoni | 726/9 |
| 2010/0127083 A1* | 5/2010 | Brown et al. | 235/492 |
| 2010/0180328 A1* | 7/2010 | Moas et al. | 726/6 |
| 2010/0191977 A1* | 7/2010 | Landrock et al. | 713/176 |
| 2010/0332398 A1* | 12/2010 | Aage et al. | 705/64 |
| 2011/0060690 A1* | 3/2011 | Mohss et al. | 705/72 |
| 2011/0231648 A1* | 9/2011 | Robertson et al. | 713/150 |
| 2012/0066504 A1* | 3/2012 | Hird et al. | 713/183 |
| 2012/0066749 A1* | 3/2012 | Taugbol et al. | 726/6 |
| 2013/0167213 A1* | 6/2013 | Sandhu et al. | 726/7 |
| 2014/0100973 A1* | 4/2014 | Brown et al. | 705/17 |

OTHER PUBLICATIONS

Cheng, A Novel Rubbing Encryption Algorithm and the Implementation of a Web Based One-time Password Token, IEEE, 2010, pp. 147-154.*

* cited by examiner

AUTHENTICATION METHOD AND DEVICE

FIELD OF INVENTION

The present invention is directed towards a method for authentication. More particularly, the present invention provides a method and a device using a long cryptographic key to implement a personal identification number (PIN) protection method for user authentication.

BACKGROUND OF THE INVENTION

With the advancements in the field of Web and Mobile based commerce and communications, secure authentication has emerged as one of the most important requirements for any electronic commerce or mobile commerce based organization. Various situations require a user to be authenticated, in particular for financial transactions and it is anticipated that such authentications will only grow with time.

With the increase in penetration of mobile handheld devices, the number of applications designed for these platforms is also on the rise. In some mobile applications, it is essential for users to be able to authenticate themselves to other users on the phone network or to a service provider on the same network. One such application is mobile-phone based banking, wherein users maintain bank accounts with a central authority (both connected via a mobile phone network) and transfer money from their account into another user's account using a phone-based messaging protocol. Whenever the banking authority receives requests for such transactions from a user, it must first authenticate the user and only then let the transaction take place.

Mobile-phone based banking systems are becoming popular in many parts of the world, particularly in the developing countries of the world. Implementing authentication protocols on mobile phones in the developing world is a challenge since a large number of such phones have low computing and storage capabilities and thus cannot implement robust cryptographic algorithms that one may want to use for secure user authentication. The problem is exacerbated by the fact that mobile phone manufacturers are upping their investment in low-end phones due to their increasing demand in rural areas, but without much parallel effort to equip such phones with security features. In fact, several current implementations for implementing secure communication over mobile phone networks (e.g., those for GSM-based telephony) have been shown to be susceptible to easy attacks.

A paper-based solution for authentication in mobile-phone based banking is proposed in an article titled "Secure Branchless Banking" by Ashlesh Sharma and Lakshmi Subramanian and Dennis Shasha from New York University published in NSDR [Please provide full form] 2009. The solution proposed relies on transmitting fresh random nonces and a voice-based identifier per transaction. Hence, the proposed solution is not easy to use and requires additional software support.

Consequently, an authentication device and method which is strong, reliable, and resistant to security breaches, and at the same time is easy to use by a wide variety of users hailing from diverse backgrounds is required. Also is required an authentication device and method which may be implemented on low-end phones without the installation of any cryptographic software and without modifying the communication protocols used for messaging through mobile phones

SUMMARY OF THE INVENTION

The present invention provides a method for authenticating a user of a mobile device by a verification authority, by making use of at least a personal identification number (PIN) and at least one cryptographic key, the PIN and the cryptographic key being known only to the user and the verification authority. The cryptographic key comprises at least one session key. The method at least comprises the steps of: a. the user encoding the PIN by using at least one session key; b. the user transferring the encoded PIN to a predefined address of the verification authority via the mobile device; c. the verification authority decoding the PIN by using the cryptographic key; and d. the verification authority authenticating the user if the decoded PIN matches a PIN stored corresponding to the user. In an embodiment, the mobile device is a cellular telephone, whereas in another it is a mobile computing device.

In an embodiment, the PIN comprises a sequence of predefined number of characters and is known only to the user and the verification authority. The step of encoding the PIN by using a cryptographic key comprises replacing each character of the PIN by a corresponding character of at least one session key. In an embodiment, the cryptographic key comprises a sequence of digits, wherein each digit is selected randomly from the number set $\{0, 1, \ldots, 9\}$ by using a secure random number generator, the cryptographic key being broken up into one or more session keys comprising 10 digits each.

The user is provided with a cryptographic key comprising a plurality of session keys, each session key being used for authenticating the user only once. In an embodiment, the cryptographic key being provided in the form of a paper booklet. Also in another embodiment, the cryptographic key comprises a sequence of alphabets, wherein each alphabet is selected randomly from a predefined alphabet set by using a secure random alphabet generator, the cryptographic key being broken up into one or more session keys comprising a predefined number of alphabets each, one or more transformation codes being presented to the user in a plurality of presentation styles.

In an embodiment, a session key used for encoding the PIN once is removed from the cryptographic key by the user and the verification authority. Each PIN is stored by the verification authority in a hashed format by using a cryptographically secure hash function. In another embodiment, the step of encoding the PIN by using a cryptographic key comprises replacing each character of the PIN by a corresponding character of at least one session key by using a slider to assist in looking up a session key, the slider being movable over a plurality of session keys enabling a user to lookup a desired session key by sliding the slider over a medium containing the cryptographic key, the slider comprising grooves of predefined size causing each digit of a session key fall into one of the grooves when the slider is placed over the session key.

Further, in one embodiment the present invention provides an electronic device for storing one or more session keys used for authenticating a user of a mobile device having at least a personal identification number (PIN), the PIN and the one or more session keys being known only to the user and a verification authority. The user encodes the PIN by using at least one session key and transfers the encoded PIN to the verification authority for authenticating the user by decoding the PIN and verifying if the decoded PIN matches a PIN stored corresponding to the user. The electronic device comprises: a processor; a screen for displaying at least one current session key; memory for storing a plurality of session keys; and at least two navigational buttons for accessing a previous or a next session key.

The PIN comprises a sequence of predefined number of characters and encoding the PIN by using a session key comprises replacing each character of the PIN by a corresponding character of at least one session key. In an embodiment, each session key comprises a sequence of digits, wherein each digit is selected randomly from the number set $\{0, 1, \ldots, 9\}$ by using a secure random number generator.

In an embodiment, the screen is an LCD screen comprising a 3 digit display for providing a session key number and a 10 digit display for providing a session key. In another embodiment, each session key comprises a sequence of alphabets, wherein each alphabet is selected randomly from a predefined alphabet set by using a secure random alphabet generator. Also, in an embodiment, the processor prompts the user to delete a session key from the memory once the session key has been used for encoding the PIN, enabling a session key to be used for encoding the PIN only once. The electronic device is powered by one of: a power source and a battery, and further comprises a numeric keypad for entering the PIN into the electronic device, the encoding of the entered PIN by using a session key stored in the electronic device being performed by the processor, the encoded PIN being displayed on the screen.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

Figure 1:
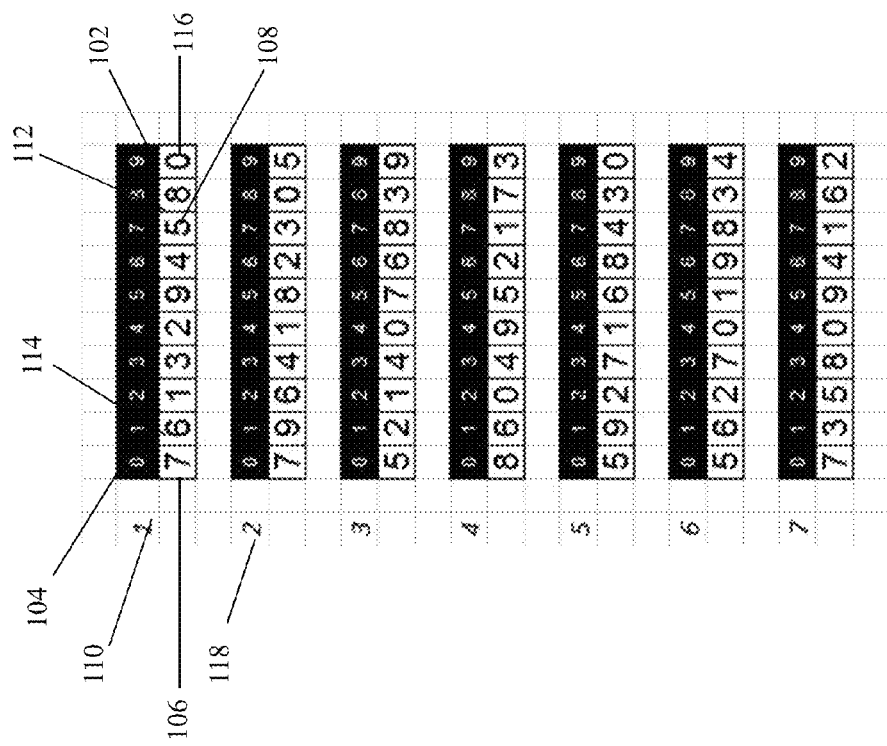
FIG. 1 illustrates a list of session keys, in accordance with an embodiment of the present invention.

The present invention provides a device for authenticating a user of a mobile device such as a mobile phone or other personal computing device. The present invention also provides a plurality of methods to perform remote user authentication over a communication network without the installation of any cryptographic software on the access devices and without modifying the default communication protocol in any manner. The methods rely on a shared personal identification number (PIN) between the user and the verifying authority. Authentication is performed by having the user input the PIN into an associated network access point in an encrypted manner, transmitting the encrypted PIN and verifying, at the authority's end, that the transmitted data can be decrypted to recover the PIN. Encryption is performed by the user prior to PIN entry using a unique cryptographic key that is stored on paper and the encryption protocol is designed to be usable even by low-literate users.

The authentication methods and device described herein is cost effective, and provides secure authentication to organizations involving mobile or electronic commerce, online transfer of funds, other banking functionalities which can be performed electronically, and other places where user authentication is a requirement to access the device.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The user authentication methods provided by the present invention require that each user shares a unique personal identification number (PIN) with a verification authority. In various embodiments, each PIN is a sequence of digits and for purpose of illustration each PIN described herein has 4 digits. The solution provided herein can easily be extended to a setting where PINs are longer or shorter. Security of the present solution relies on the secrecy of a PIN and no party other than the legitimate user or the verification authority must be aware of the PIN.

The present invention would now be discussed in context of embodiments as illustrated in the accompanying drawings.

In various embodiments, the present invention provides methods of user authentication involving generation of a long cryptographic key for each user.

The cryptographic key may be stored on a paper card or a booklet of cards or any other medium from which the keys may easily be accessed or read by the user. A copy of the key is given to the user and another copy is maintained by a verification authority in digital form. In an embodiment, each key is represented by a sequence of digits wherein each digit is selected randomly from the number set $\{0, 1, \ldots, 9\}$ by using a secure random number generator. The cryptographic key is broken up into segments of 10 digits each and each segment is referred to as a session key. FIG. 1 illustrates a list of session keys, in accordance with an embodiment of the present invention. Each session key illustrated in FIG. 1 is represented as a 2 by 10 table 102 where the first row 104 of the table 102 is always fixed and contains the digits 0, 1, ... , 9 in that order. The 10 digits in the session key are stored in the second row 106 of the table 102.

In an embodiment of the present invention a user is required to use a single session key for each encryption operation. The user is required to append each outgoing message with his/her encrypted PIN where the encryption is performed under the first unused session key in the list of session keys. In an embodiment of the present invention, the session keys are provided to users in the form of paper booklets. There are a large number of session keys in each paper booklet, of the order of about 100. (In the figures, only one card in such a booklet is shown.) Upon exhaustion of all session keys, the user is issued a new paper booklet with a fresh cryptographic key suitably segmented into session keys.

With reference to FIG. 1, in order to encrypt the PIN with a particular session key, the user is required to perform a digit-by-digit lookup in the table 102 and return the 4 digits in the session key whose positions correspond to the digits of the PIN. For example, if the user's PIN is 7819, the user first looks up the $7^{th}$ digit 108 in the first session key 110, then the $8^{th}$ digit 112, then the $1^{st}$ digit 114 and then the $9^{th}$ digit 116; these 4 digits put together form the encryption of the PIN. If the user is currently working with the first session key 110 illustrated in FIG. 1, the encrypted PIN would consist of the $7^{th}$ digit 108 in the session key (which is 5), followed by the $8^{th}$ digit 112 (which is 8), followed by the $1^{st}$ digit 114 (which is 6) and followed by the $9^{th}$ digit 116 (which is 0), resulting in digits 5860 as the encrypted PIN.

If the user is currently working with the second session key 118 illustrated in FIG. 1, and the user's PIN is 7819, the encrypted PIN would be obtained by suitably looking up the digits 7, 8, 1, 9 in the second table 120, which gives digits 3095 as the encrypted PIN. In an embodiment, the paper card or booklet is implemented in a way such that once a session key has been used for encryption, it is deleted from the booklet by the user. The deletion of used session keys is important to guarantee strong security; however, the method of the present invention works even if the deletion facility is not implemented. In various embodiments, it is important that both the user and the verification authority keep track of the first unused session key in the sequence of session keys corresponding to the user. This is the key that is used for encryption as well as decryption of the PIN in every transmission from the user to the verification authority.

In various embodiments of the present invention, the user appends the encrypted PIN to the message that needs to be transmitted and sends the resulting message to the verification authority, along with his/her identifier (like mobile phone number). Upon receipt of the message, the verification authority decrypts the last 4 digits in the message using the copy of the user's key it maintains (decryption involves performing a reverse lookup in the table corresponding to the session key) and checks if the decryption is the same as the user's PIN. If it is, authentication succeeds; else, it fails.

Exemplary Embodiment #1

In an embodiment of the present invention, in certain scenarios, encryption of multiple PINs may result in the same digits, i.e multiple PINs may have the same encryption. This would happen if the session key being used has repeated digits causing two digits from two different PINs to be mapped to the same encryption digit. In order to address this possibility, in an embodiment of the present invention, an encrypted PIN received by the verification authority may be decrypted to multiple user PIN values. The verification authority determines if any one of obtained user PIN values correspond to the expected PIN. Authentication fails only if none of the obtained user PIN values corresponds to an expected Pin value. In an embodiment, the session keys are generated in a manner such that each session key is a random permutation of the digits $\{0, 1, \ldots, 9\}$, picked uniformly at random from all such permutations. Such a random selection of session key digits automatically eliminates the possibility of an encryption being decrypted to multiple candidate PINs. In various embodiments, the user PINs are stored in a hashed manner at the verification authority using a cryptographically secure hash function. This is meant to ensure that an attacker who gets access to the storage at the verification authority has little advantage in deriving the users' PINs which are meant to remain secret.

Exemplary Embodiment #2

In an embodiment of the present invention, the encrypted PIN is not numeric, but consists of symbols from an arbitrary alphabet. For example, the PINs could be obtained from the English alphabet or from any other alphabet readable by the target users. Session keys would be of the same length as the alphabet size and would consist of random symbols from the alphabet. For encrypting the PIN, the same lookup operation would be used as in the case of digits described with reference to FIG. 1.

Exemplary Embodiment #3

Figure 2:
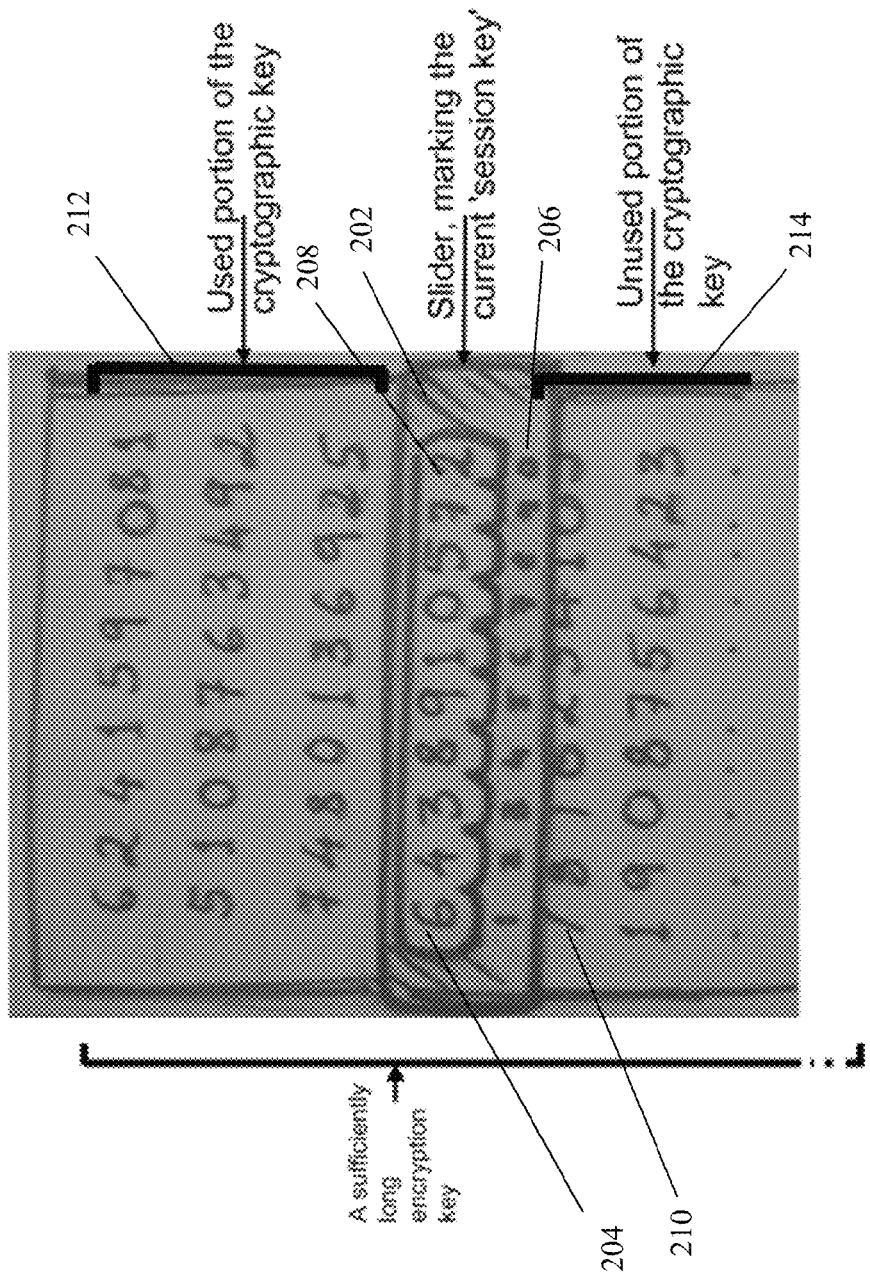
FIG. 2 illustrates list of session keys provided with a slider, in accordance with an embodiment of the present invention.

In an embodiment of the present invention, the session keys are represented not as tables but just as a sequence of digits (or alphabets, in the general case). To make the lookup process easy for the user, a "slider" is implemented. FIG. 2 illustrates list of session keys provided with a slider. The slider 202 has the digits 0, 1, ..., 9 written on it, suitably spaced out so that when placed on top of a session key 204, the '0' 206 in the slider 202 is located above the first digit 208 of the session key, '1' is located above the second digit, '2' above the third digit and so on. The slider 202 is movable from being situated above one session key 204 to being situated above another session key 210 and would assist in performing lookups for all session keys in the list. The session keys 212 situated above the slider 202 are the session keys that have been used whereas those 214 situated below the slider are the unused session keys. In an embodiment, the slider 202 may itself be a paper object or may be made of some other materials, and it may either be attached to a paper booklet of session keys or may be separate. In an embodiment, the slider has 10 grooves built into it of suitable size so that when it is placed over a session key, each digit of the session key falls into one of the grooves.

Exemplary Embodiment #4

Figure 3:
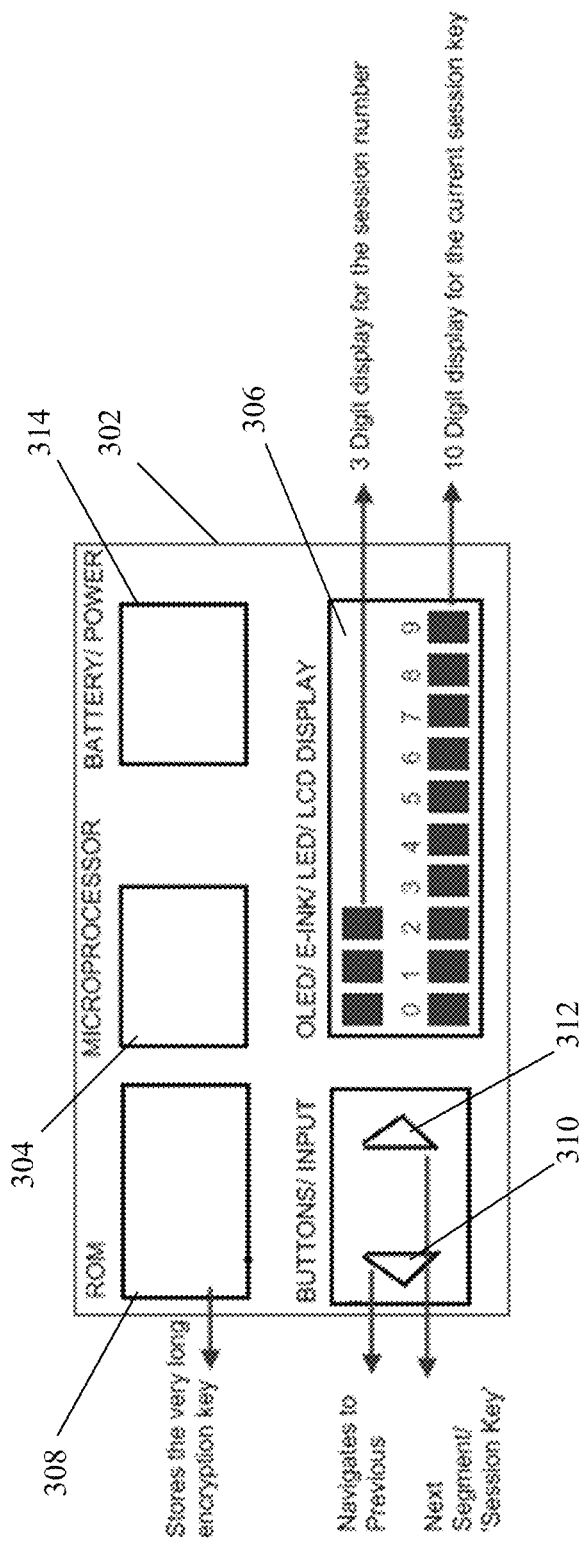
FIG. 3 illustrates an electronic dongle used for storing session keys, in accordance with an embodiment of the present invention.

In an embodiment of the present invention, where PIN-based transactions are very frequent and session keys expire early, the session keys are stored electronically rather than on paper. FIG. 3 illustrates an electronic dongle used for storing session keys, in accordance with an embodiment of the present invention. Each user holds an electronic dongle 302 comprising a processor 304 and an LCD screen 306 that displays the current session key. The LCD screen 306 comprises a 3 digit display for providing a session key number and a 10 digit display for providing a session key. The electronic dongle 302 is equipped with read only memory (ROM) 308 or flash memory which stores all the session keys provided to the user. Navigational buttons 310 and 312 may be used to access a previous or a next session key respectively. Session keys may be deleted from memory as and when they are used for encryption. The dongle 302 may be powered by a powers source or battery 314.

Figure 4:
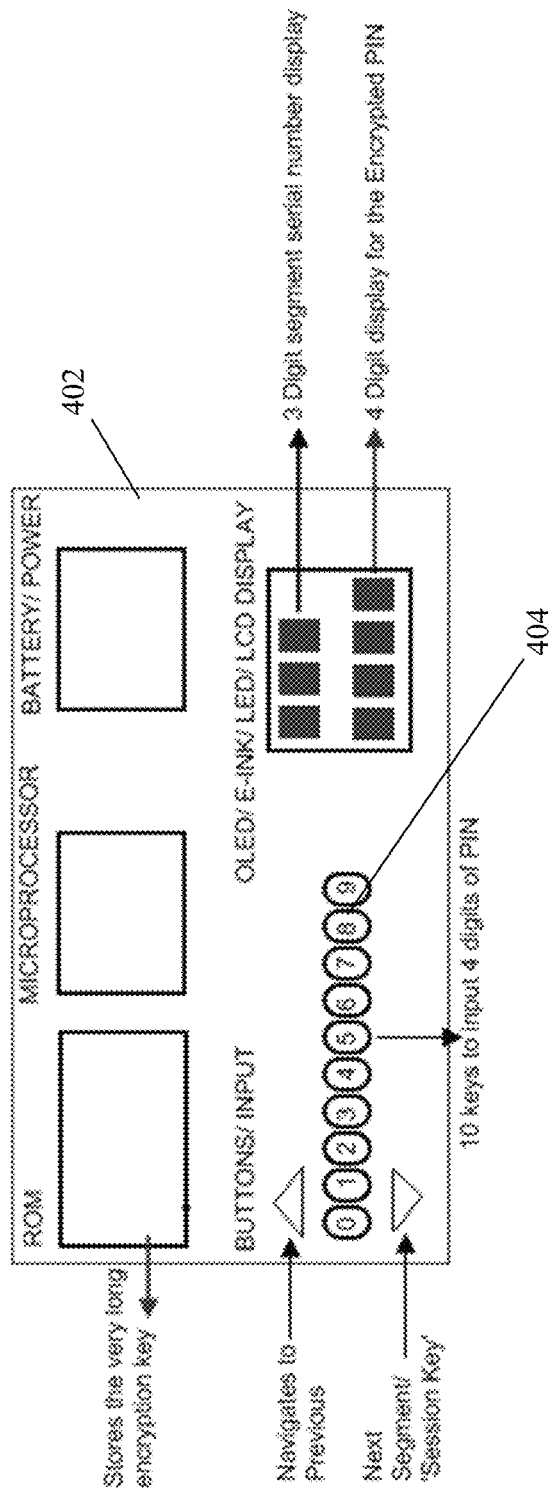
FIG. 4 illustrates another dongle used for storing session keys, in accordance with an embodiment of the present invention.

In an embodiment, the dongle is equipped with a numeric keypad and the encryption operation itself is performed by the dongle, thus making the user interface even more accessible to illiterate users. FIG. 4 illustrates another dongle used for storing session keys, in accordance with an embodiment of the present invention. In addition to the components described with reference to FIG. 3, the dongle 402 comprises a set of 10 keys 404 for entering a user's PIN number. The entered PIN is encrypted using a session key and the lookup method described with reference to FIG. 1 electronically by the processor of the dongle 402, and the encrypted PIN is displayed on the LCD screen.

Figure 5:
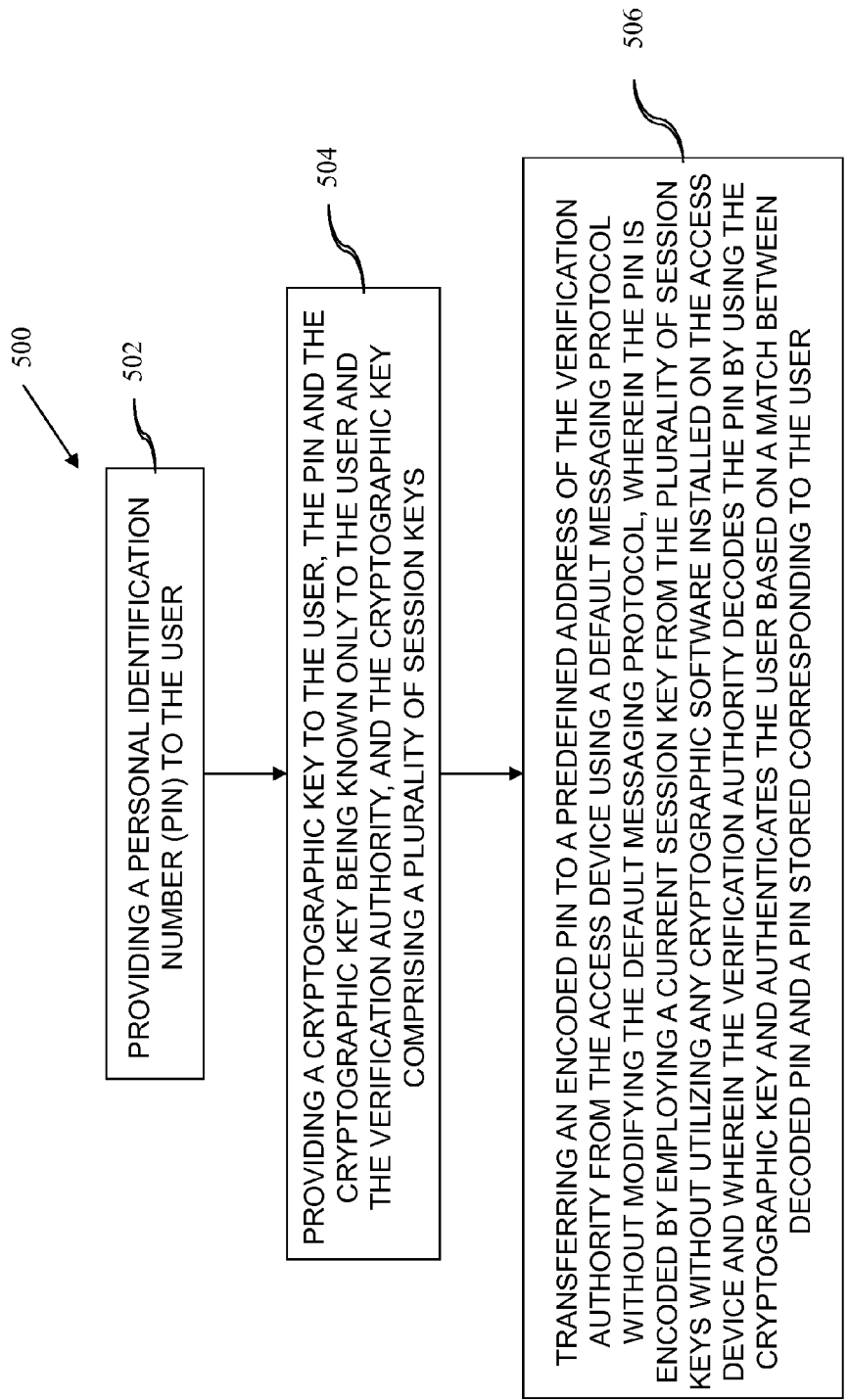
FIG. 5 illustrates a process for authenticating a user in accordance with one aspect of the present technique.

Referring now to FIG. 5, an exemplary process 500 for authenticating a user of an access device by a verification authority is provided. The process includes providing a personal identification number (PIN) to the user at step 502 and providing a cryptographic key to the user at step 504. The PIN and the cryptographic key are known only to the user and the verification authority. The cryptographic key includes a plurality of session keys. The process 500 further includes transferring an encoded PIN to a predefined address of the verification authority from the access device using a default messaging protocol without modifying the default messaging protocol at step 506. The PIN is encoded by employing a current session key from the plurality of session keys without utilizing any cryptographic software installed on the access device and the verification authority decodes the PIN by using the cryptographic key and authenticates the user based on a match between decoded PIN and a PIN stored corresponding to the user.

Figure 6:
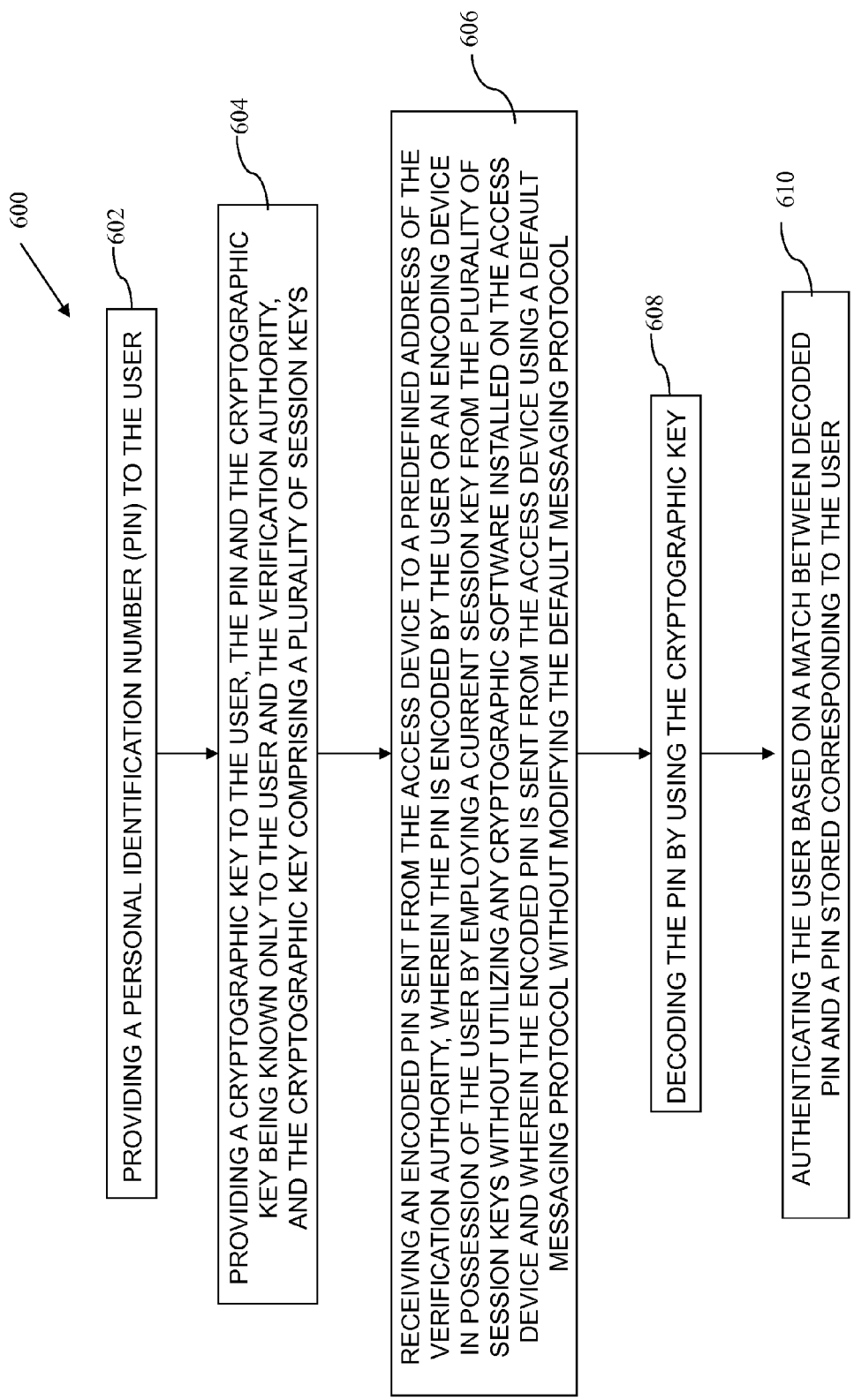
FIG. 6 illustrates a process for authenticating the user in accordance with another aspect of the present technique.

Similarly, referring to FIG. 6, another exemplary process 600 for authenticating the user of the access device by the verification authority is provided. The process includes providing a personal identification number (PIN) to the user at step 602 and providing a cryptographic key to the user at step 604. The PIN and the cryptographic key are known only to the user and the verification authority. The cryptographic key includes a plurality of session keys. The process 600 further includes receiving an encoded PIN sent from the access device to a predefined address of the verification authority at step 606. The PIN is encoded by the user or an encoding device in possession of the user by employing a current session key from the plurality of session keys without utilizing any cryptographic software installed on the access device. Further, it should be noted that the encoded PIN is sent from the access device using a default messaging protocol without modifying the default messaging protocol. Additionally, the process 600 includes decoding the PIN by using the cryptographic key at step 608, and authenticating the user based on a match between decoded PIN and a PIN stored corresponding to the user at step 610.

Hence the present invention provides a paper-based interface for storing a long sequence of cryptographic session keys and using secure methods for performing PIN encryption. The invention also provides a low-cost electronic equipment for performing the encryption. The present invention also provides a method for performing PIN encryption, or more generally, of short numeric messages, where both the encryption and decryption operations are easy to implement and can be performed by humans with very limited literacy and numeric skills. Consequently, a method for encrypting messages at the "user interface" layer (above the application layer) of the communication protocol is provided, i.e., even before messages are received by a software application, they have been encrypted by the user. This makes the encryption more robust against potential mal-ware on the communication network. Hence, the present invention builds upon a simple cryptographic scheme like the one-time pad to design an encryption method which can be implemented entirely by humans and without any software support.

While the exemplary embodiments of the present invention are described and illustrated herein, it will be appreciated that they are merely illustrative. It will be understood by those skilled in the art that various changes in form and detail may be made therein without departing from or offending the spirit and scope of the invention.

What is claimed is:

1. A method for authenticating a user of an access device by a verification authority, the method comprising:
providing a personal identification number (PIN) to the user;
providing cryptographic keys to the user, the PIN and the cryptographic keys being known only to the user and the verification authority, and the cryptographic keys comprising a plurality of session keys;
transferring an encoded PIN to a predefined address of the verification authority from the access device using a default messaging protocol of the access device without modifying the default messaging protocol, wherein the PIN is encoded by employing a current session key from the plurality of session keys outside the access device and without utilizing a cryptographic software installed on the access device and wherein the verification authority decodes the PIN by using the cryptographic keys and authenticates the user based on a match between decoded PIN and a PIN stored corresponding to the user, wherein the PIN is encoded by using the cryptographic keys by replacing each character of the PIN by a corresponding character of the current session key, and wherein a slider is used to assist in looking up the current session key, the slider being movable over the plurality of session keys enabling the user to look up a desired session key by sliding the slider over a medium containing the cryptographic keys, the slider comprising grooves of predefined size causing each digit of the desired session key to fall into one of the grooves when the slider is placed over the desired session key.

2. The method as claimed in claim 1 wherein transferring the encoded PIN from the access device comprises transferring the encoded PIN from a mobile device or a transceiver.

3. The method as claimed in claim 1 wherein the PIN comprises a sequence of predefined number of characters.

4. The method as claimed in claim 1 wherein the cryptographic keys comprises a sequence of digits, wherein each digit is selected randomly from the number set $\{0, 1, \ldots, 9\}$ by using a secure random number generator, the cryptographic keys being broken up into a plurality of session keys comprising 10 digits each.

5. The method as claimed in claim 1 wherein the user is provided with the cryptographic keys comprising a plurality of session keys in the form of a paper booklet and wherein each session key is used for encoding the PIN only once.

6. The method as claimed in claim 1 wherein the cryptographic keys comprises a sequence of alphabets, wherein each alphabet is selected randomly from a predefined alphabet set by using a secure random alphabet generator, the cryptographic keys being broken up into a plurality of session keys comprising a predefined number of alphabets each, the plurality of session keys being presented to the user in a plurality of presentation styles.

7. The method as claimed in claim 1 wherein the current session key used for encoding the PIN once is removed from the cryptographic keys by the user and the verification authority.

8. The method as claimed in claim 1 wherein the PIN is stored by the verification authority in a hashed format by using a cryptographically secure hash function.

9. An authentication system comprising:
an electronic device and a transceiver comprising:
a memory comprising a plurality of session keys of cryptographic keys, wherein each of the plurality of session keys is used for encoding a personal identification number (PIN) of a user and wherein the PIN and the cryptographic keys is known only to the user and a verification authority;
a processor coupled to the memory to retrieve a current session key from the plurality of session keys, or to encode the PIN by using the current session key;
a screen to display the current session key, or to display the encoded PIN; and at least two navigational buttons to access a previous or a next session key, or to access a previous or a next encoded PIN, the transceiver configured to transfer the encoded PIN to the verification authority using a default messaging protocol of the transceiver without modifying the default messaging protocol, wherein the PIN is encoded by employing the current session key outside the transceiver and without utilizing a cryptographic software installed on the transceiver, wherein the verification authority receives the encoded PIN, decodes the PIN by using the cryptographic keys, and authenticates the user based on a match between decoded PIN and a PIN stored corresponding to the user;

wherein the electronic device further comprises a numeric keypad for entering the PIN into the electronic device, wherein the processor is configured to encode the PIN based on the current session key, wherein the PIN is encoded by using the cryptographic keys by replacing each character of the PIN by a corresponding character of the current session key; and the screen is configured to display the encoded PIN, and the at least two navigational buttons are configured to provide access to a previous or a next encoded PIN.

10. The authentication system as claimed in claim 9 wherein the PIN comprises a sequence of predefined number of characters.

11. The authentication system as claimed in claim 9 wherein the PIN is encoded by replacing each character of the PIN by a corresponding character of the current session key.

12. The authentication system as claimed in claim 9 wherein each session key comprises a sequence of digits, wherein each digit is selected randomly from the number set $\{0, 1, \ldots, 9\}$ by using a secure random number generator.

13. The authentication system as claimed in claim 9 wherein the screen is an LCD screen comprising a first display portion to display a session key number and a second display portion to display the current session key or to display the encoded key.

14. The authentication system as claimed in claim 9 wherein each session key comprises a sequence of alphabets, wherein each alphabet is selected randomly from a predefined alphabet set by using a secure random alphabet generator.

15. The authentication system as claimed in claim 9 wherein the processor prompts the user to delete a the current session key from the memory once the current session key has been used for encoding the PIN, ensuring a session key is used for encoding the PIN only once.

16. The authentication system as claimed in claim 12 wherein the electronic device is powered by one of: a power source and a battery.

17. A method for authenticating a user of an access device by a verification authority, the method comprising:

providing a personal identification number (PIN) to the user;

providing cryptographic keys to the user, the PIN and the cryptographic keys being known only to the user and the verification authority, and the cryptographic keys comprising a plurality of session keys;

receiving an encoded PIN sent from the access device to a predefined address of the verification authority, wherein the PIN is encoded by the user or an encoding device in possession of the user by employing a current session key from the plurality of session keys outside the access device and without utilizing a cryptographic software installed on the access device and wherein the encoded PIN is sent from the access device using a default messaging protocol of the access device without modifying the default messaging protocol;

decoding the PIN by using the cryptographic keys; and authenticating the user based on a match between decoded PIN and a PIN stored corresponding to the user, wherein the PIN is encoded by using the cryptographic keys by replacing each character of the PIN by a corresponding character of the current session key, and wherein a slider is used to assist in looking up the current session key, the slider being movable over the plurality of session keys enabling the user to look up a desired session key by sliding the slider over a medium containing the cryptographic keys, the slider comprising grooves of predefined size causing each digit of the desired session key to fall into one of the grooves when the slider is placed over the desired session key.

* * * * *